(12) United States Patent
Yanagisawa

(10) Patent No.: US 10,451,913 B2
(45) Date of Patent: Oct. 22, 2019

(54) LIQUID CRYSTAL DISPLAY PANEL

(71) Applicant: Japan Display Inc., Tokyo (JP)

(72) Inventor: Syou Yanagisawa, Mobara (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/383,457

(22) Filed: Dec. 19, 2016

(65) Prior Publication Data

US 2017/0097539 A1   Apr. 6, 2017

Related U.S. Application Data

(63) Continuation of application No. 13/802,889, filed on Mar. 14, 2013, now abandoned.

(30) Foreign Application Priority Data

Apr. 27, 2012 (JP) ................................ 2012-102711

(51) Int. Cl.
*G02F 1/1335* (2006.01)
*G02F 1/1368* (2006.01)
(Continued)

(52) U.S. Cl.
CPC ...... *G02F 1/133512* (2013.01); *G02F 1/1339* (2013.01); *G02F 1/1368* (2013.01);
(Continued)

(58) Field of Classification Search
CPC ......... G02F 1/133512; G02F 1/136286; G02F 1/1368; G02F 1/1339; G02F 2001/13388;
(Continued)

(56) References Cited

U.S. PATENT DOCUMENTS 6,492,700 B1   12/2002   Lin et al.
8,314,766 B2   11/2012   Chang
(Continued)

FOREIGN PATENT DOCUMENTS

JP   H11-052394 A   2/1999
JP   2003-084268 A   3/2003
(Continued)

OTHER PUBLICATIONS

Japanese Office Action dated Apr. 21, 2015 for corresponding Japanese Patent Application No. 2012-102711.

*Primary Examiner* — Paisley L Arendt
*Assistant Examiner* — Mariam Qureshi
(74) *Attorney, Agent, or Firm* — Michael Best & Friedrich LLP

(57) ABSTRACT

The liquid crystal display panel according to the present invention is a liquid crystal display panel LCD wherein a CF substrate S1 on which color filters are formed and a TFT substrate S2 on which thin film transistor circuits are formed are layered on top of each other with liquid crystal being sealed between the two substrates, characterized in that a black light blocking region BM is formed in a frame portion of the CF substrate S1, and an identification mark M drawn as a negative pattern is provided to a part of the light blocking region, and a metal film MT1 is provided to the TFT substrate S2 in such a location as to block light that transmits through the identification mark.

11 Claims, 10 Drawing Sheets

(51) Int. Cl.
 *G02F 1/1362* (2006.01)
 *G02F 1/1339* (2006.01)
 *G02F 1/1333* (2006.01)

(52) U.S. Cl.
 CPC .. *G02F 1/136209* (2013.01); *G02F 1/136286* (2013.01); *G02F 2001/133374* (2013.01); *G02F 2001/133388* (2013.01)

(58) Field of Classification Search
 CPC ..... G02F 2001/133374; G02F 1/13394; G02F 2001/13456; G02F 2001/133388
 See application file for complete search history.

(56) References Cited

U.S. PATENT DOCUMENTS

| | | |
|---|---|---|
| 2001/0022637 A1 | 9/2001 | Yu |
| 2005/0020175 A1 | 1/2005 | Tamashiro et al. |
| 2006/0012735 A1 | 1/2006 | Yamada et al. |
| 2006/0279687 A1 | 12/2006 | Park et al. |
| 2007/0109470 A1 | 5/2007 | Hosoya |
| 2010/0022637 A1 | 1/2010 | Stockwell et al. |
| 2010/0182267 A1 | 7/2010 | Lee et al. |
| 2011/0267566 A1* | 11/2011 | Shiau ................ G02F 1/133512 349/110 |
| 2012/0229736 A1* | 9/2012 | Osaki ................ G02F 1/133512 349/96 |
| 2012/0257132 A1* | 10/2012 | Kitajima ........... G02F 1/133512 349/42 |

FOREIGN PATENT DOCUMENTS

| | | |
|---|---|---|
| JP | 2005-326578 A | 11/2005 |
| JP | 2008-52145 A | 3/2008 |

* cited by examiner

LIQUID CRYSTAL DISPLAY PANEL

CROSS-REFERENCE TO RELATED APPLICATIONS

This application is a continuation of U.S. patent application Ser. No. 13/802,889 filed on Mar. 14, 2013. Further, this application claims priority over Japanese Patent Application No. 2012-102711 filed on Apr. 27, 2012, the contents of which are hereby incorporated into this application by reference.

BACKGROUND OF THE INVENTION

(1) Field of the Invention

The present invention relates to a liquid crystal display panel, and in particular to a liquid crystal display panel with an identification mark provided.

(2) Description of the Related Art

Liquid crystal display panels (LCDs) are used for display devices of various portable types of information apparatuses, such as cellular phones, personal digital assistants (PDAs), digital cameras and multimedia players.

Liquid crystal display panels are formed by pasting together a CF substrate on which color filters are formed and a TFT substrate on which thin film transistor circuits are formed and sealing liquid crystal between the two substrates. In addition, an identification mark for identifying the panel type is provided on the liquid crystal display panels.

JP 2008-52145A discloses a technology for providing letters on the TFT substrate of a liquid crystal display panel. In this case, a separate work process is required to provide an identification mark. In addition, as shown in FIGS. 1 and 2A to 2C, an identification mark may be provided on the CF substrate.

FIG. 1 is a plan diagram showing a liquid crystal display panel LCD, and thus shows how a CF substrate S1 and a TFT substrate S2 are pasted together. The symbol DP denotes the display unit, and the symbol SE denotes the sealing portion through which the two substrates are pasted together. In addition, a driver chip DR for driving the thin film transistor circuit is placed on the TFT substrate S2 near the bottom.

FIGS. 2A to 2C are diagrams showing an enlargement of the dotted circle A in FIG. 1. FIG. 2A shows the TFT substrate S2, FIG. 2B shows the CF substrate S1, and FIG. 2C shows a portion of the liquid crystal display panel LCD where the CF substrate and the TFT substrate are pasted together.

As shown in FIG. 2A, various types of wires MT, such as common lines, grounding shield lines and wires for detecting a crack in the substrate, are provided in the vicinity of the frame portion of the TFT substrate S2.

As shown in FIG. 2B, a light blocking region BM, such as a black matrix, is formed in the vicinity of the frame portion of the CF substrate S1 in order to prevent backlight from being emitted through the periphery portion of the display unit. In addition, an identification mark M is provided in the periphery portion of the light blocking region BM using the same light blocking material as for the light blocking region.

As shown in FIG. 2C, the identification mark can be read in the structure where the two substrates S1 and S2 are layered on top of each other.

SUMMARY OF THE INVENTION

In recent years, the miniaturization of portable information apparatuses has progressed while demand for an increase in the size of the screen of the display unit has increased. Therefore, it has been required to make the frame portion around the liquid crystal display panel narrower in order to increase the size of the display unit to the maximum.

In the case where the light blocking region in the frame portion of the CF substrate is formed close to the sides of the substrate, it is difficult to secure the region for providing the identification mark M as shown in FIGS. 1 and 2A to 2C.

An object to be achieved by the present invention is to solve the above-described problem and to provide a liquid crystal display panel where it is possible to provide an identification mark while achieving a reduction in the width of the frame.

In order to achieve the above-described object, the liquid crystal display panel according to the present invention has the following features.

(1) A liquid crystal display panel, wherein a CF substrate on which color filters are formed and a TFT substrate on which thin film transistor circuits are formed are layered on top of each other with liquid crystal being sealed between the two substrates, is characterized in that a black light blocking region is formed in a frame portion of the CF substrate, and an identification mark drawn as a negative pattern is provided to a part of the light blocking region, and a metal film is provided to the TFT substrate in such a location as to block light that transmits through the identification mark.

(2) The liquid crystal display panel according to the above (1) is characterized in that the metal film is connected to a part of an electric wire formed on the TFT substrate.

(3) The liquid crystal display panel according to the above (1) or (2) is characterized in that the metal film is a part of a patterned metal where a number of slits are created, and some of the slits are omitted in the location corresponding to the identification mark.

(4) The liquid crystal display panel according to the above (3) is characterized in that some slits are omitted in the same manner as the above-described omitted slits in another region of the patterned metal corresponding to the above-described omitted slits so that the patterned metal has an adjusted electrical resistance value.

(5) The liquid crystal display panel according to the above (1) or (2) is characterized in that the metal film is a part of a patterned metal where a number of slits are created, and the identification mark is made of a set of openings created in locations of the light blocking region that avoid the slits.

The present invention can provide a liquid crystal display panel where an identification mark of a negative pattern drawn in the light blocking region on the CF substrate and a metal film provided on the TFT substrate make it possible to secure the light blocking region provided in the frame portion of the liquid crystal display panel to the maximum, and thus to achieve a reduction in the width of the frame, and at the same time to provide an identification mark.

In the case where the panel is viewed from the front surface (display surface) side of the panel, in particular, external light is reflected from the metal film on the TFT substrate, which makes it possible to visually confirm the identification mark provided on the CF substrate. Furthermore, the light blocking region on the CF substrate and the metal film on the TFT substrate work together to make it possible to secure the light blocking properties for backlight from the rear surface side of the panel.

DESCRIPTION OF THE EMBODIMENTS

Figure 1:
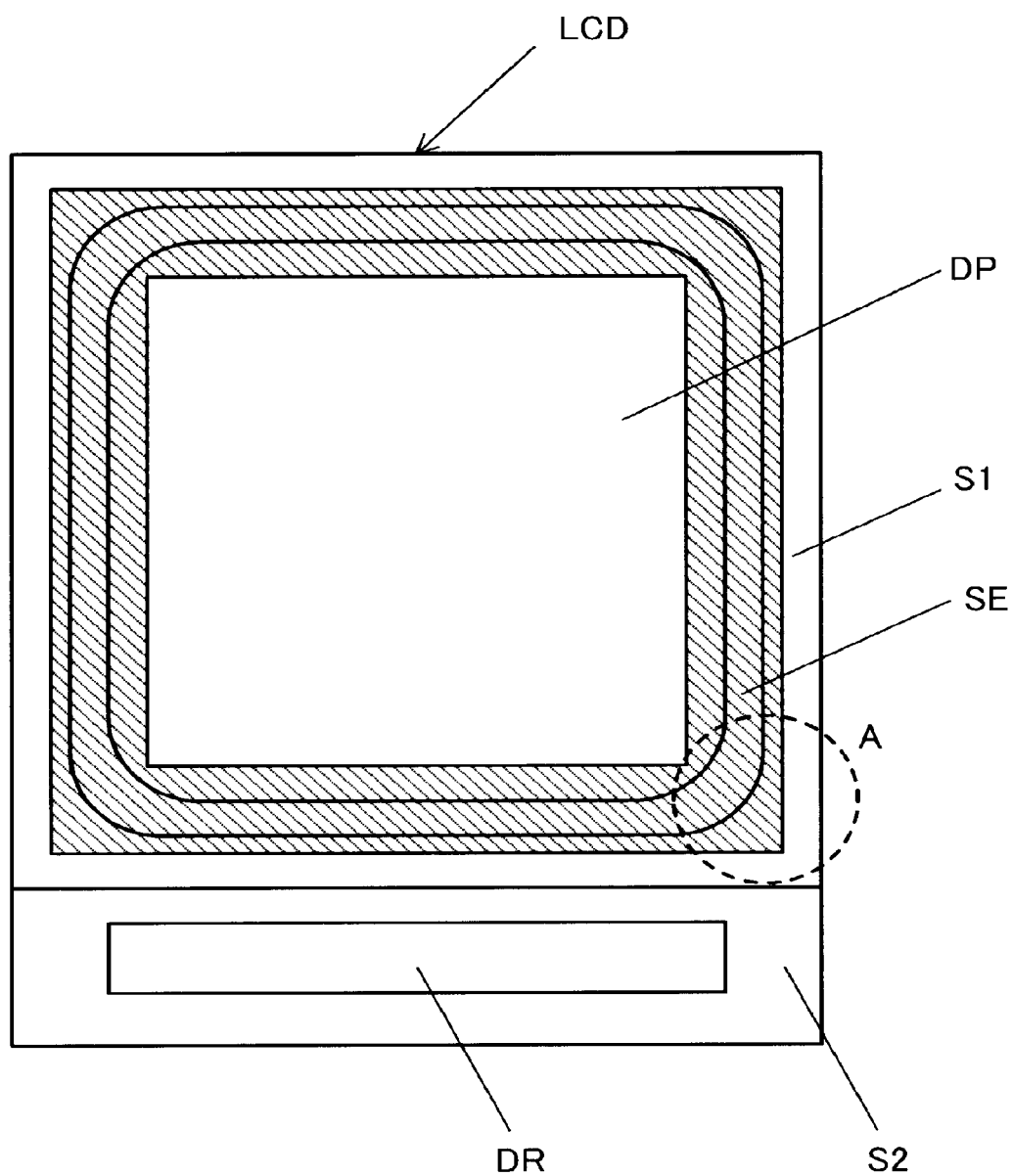
FIG. 1 is a schematic plan diagram for illustrating a conventional liquid crystal display panel.
Figure 2:
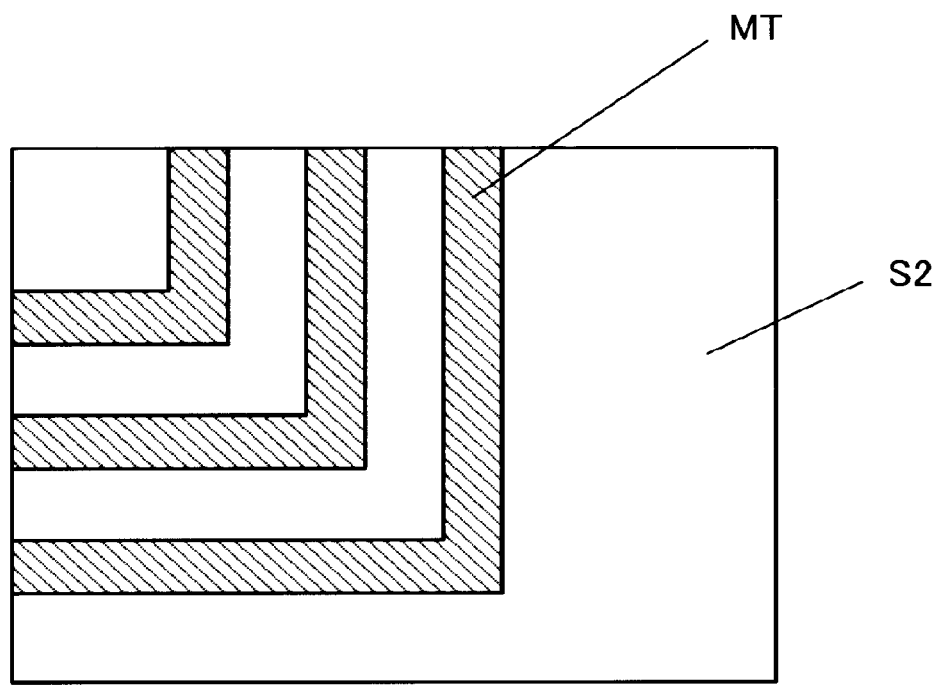
FIGS. 2A to 2C are diagrams for illustrating the TFT substrate (FIG. 2A), the CF substrate (FIG. 2B), and how the TFT substrate and the CF substrate are layered on top of each other (FIG. 2C) in the liquid crystal display panel within the dotted circle A in FIG. 1.
Figure 2:
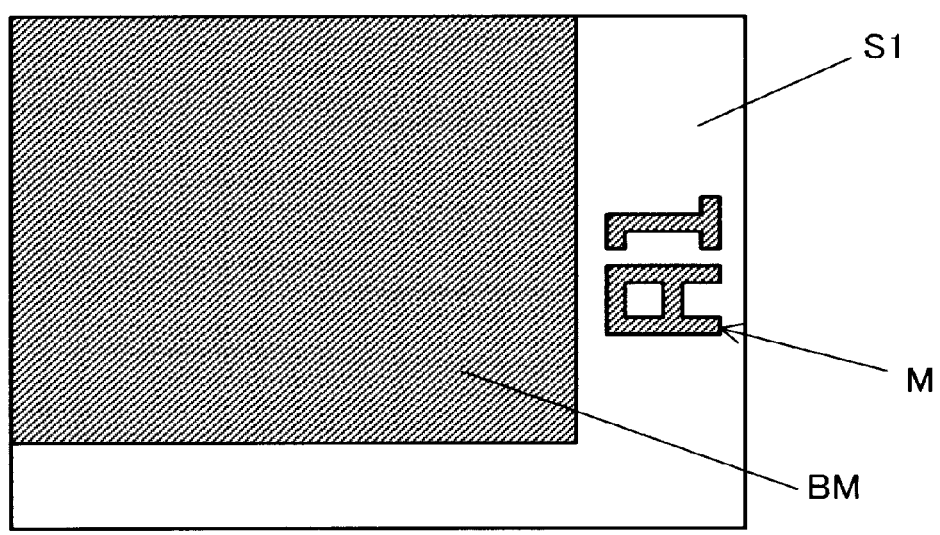
Figure 2:
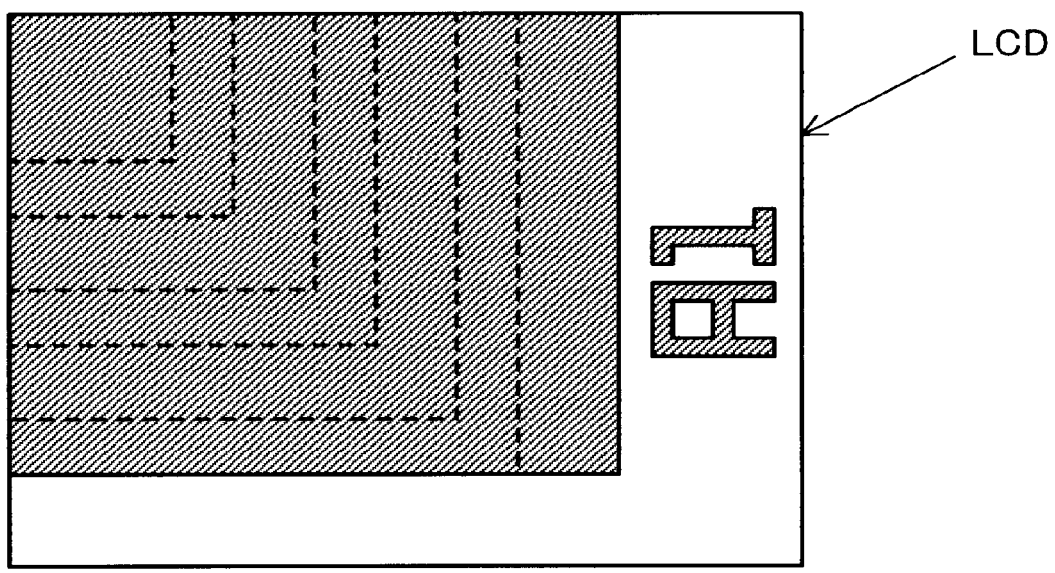
Figure 3:
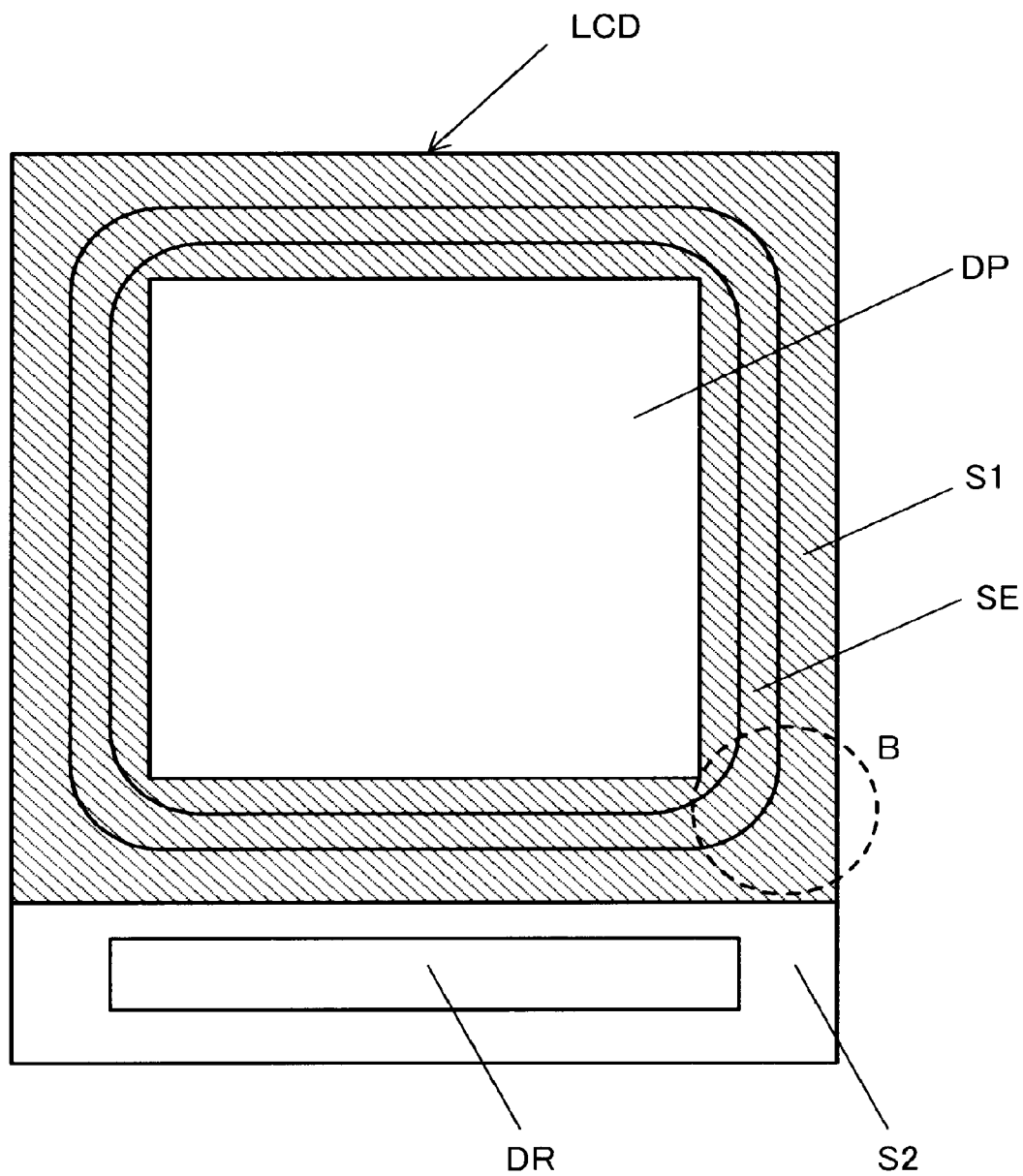
FIG. 3 is a schematic plan diagram for illustrating the liquid crystal display panel according to the present invention.
Figure 4:
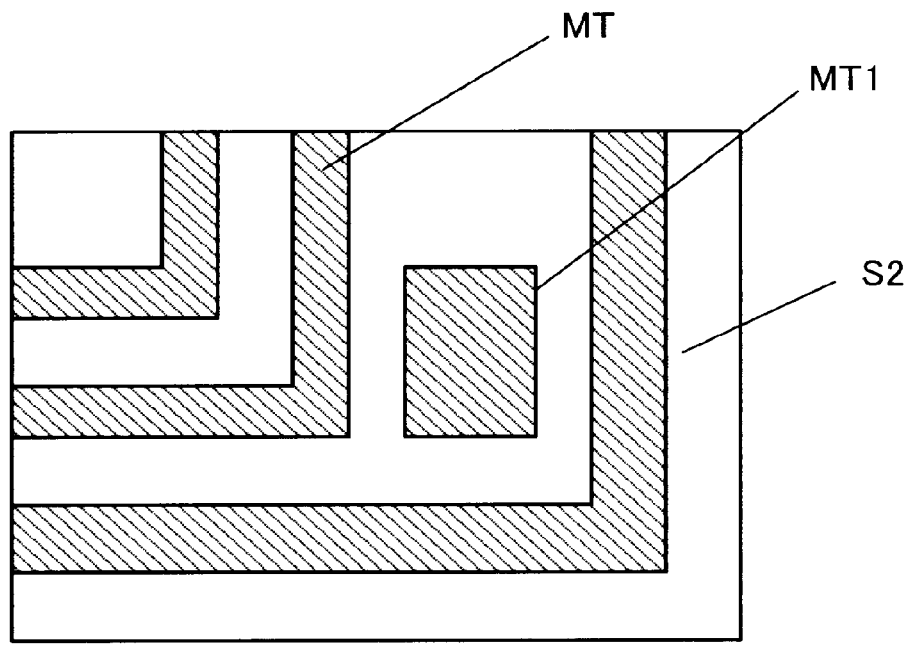
FIGS. 4A to 4C are diagrams for illustrating the TFT substrate (FIG. 4A), the CF substrate (FIG. 4B), and how the TFT substrate and the CF substrate are layered on top of each other (FIG. 4C) in the liquid crystal display panel according to the first embodiment within the dotted circle B in FIG. 3.
Figure 4:
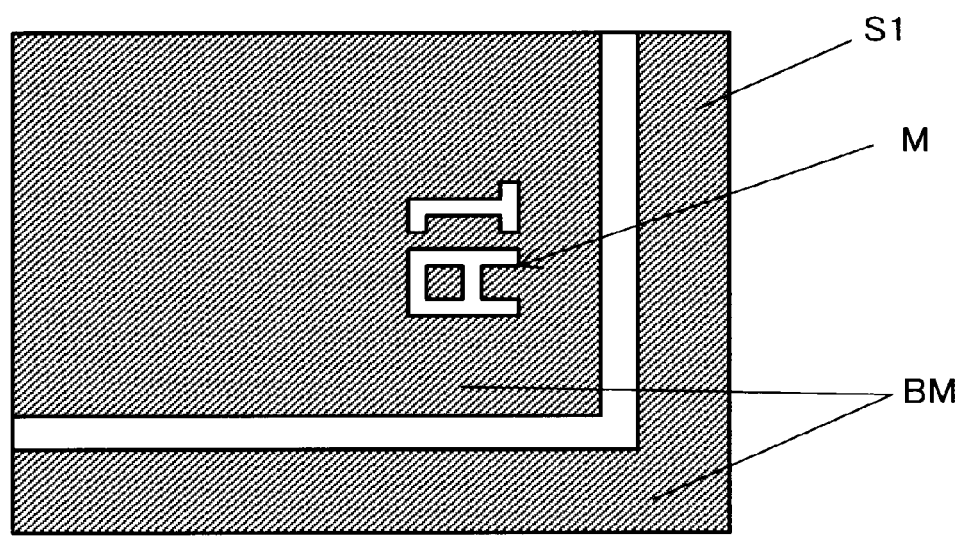
Figure 4:
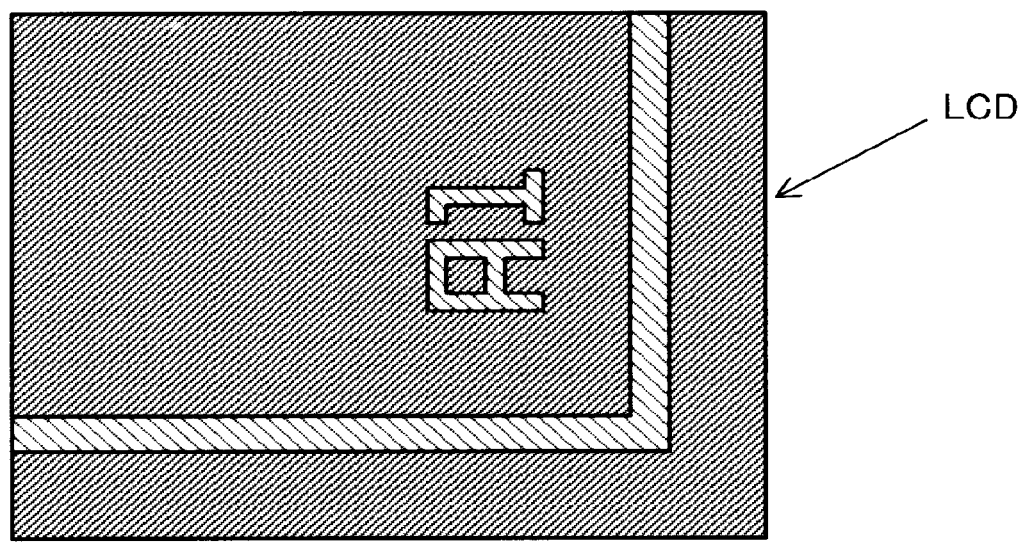
Figure 5:
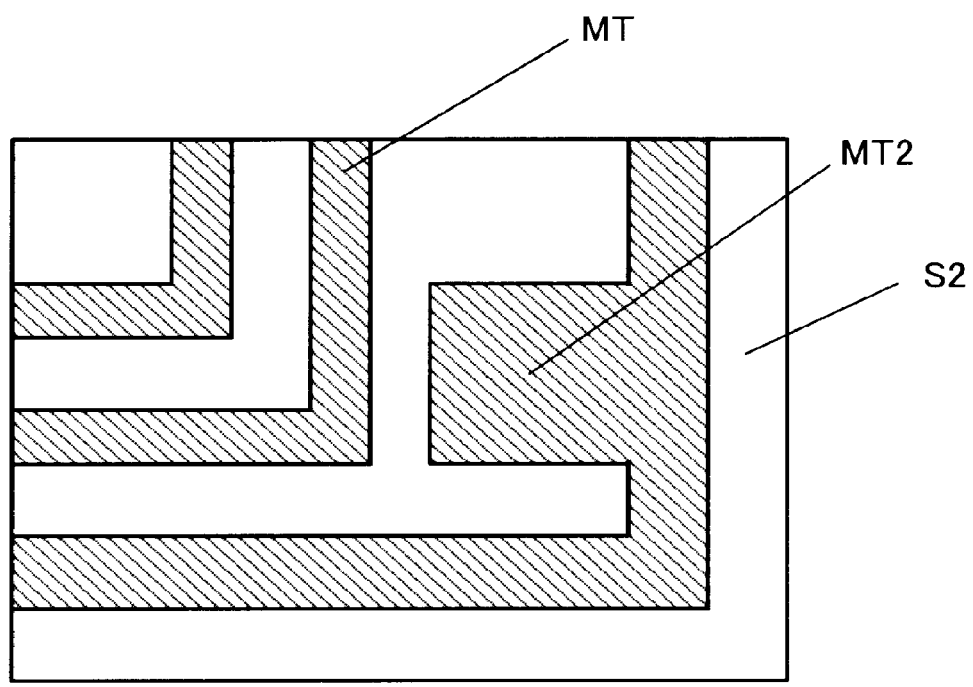
FIGS. 5A to 5C are diagrams for illustrating the TFT substrate (FIG. 5A), the CF substrate (FIG. 5B), and how the TFT substrate and the CF substrate are layered on top of each other (FIG. 5C) in the liquid crystal display panel according to the second embodiment within the dotted circle B in FIG. 3.
Figure 5:
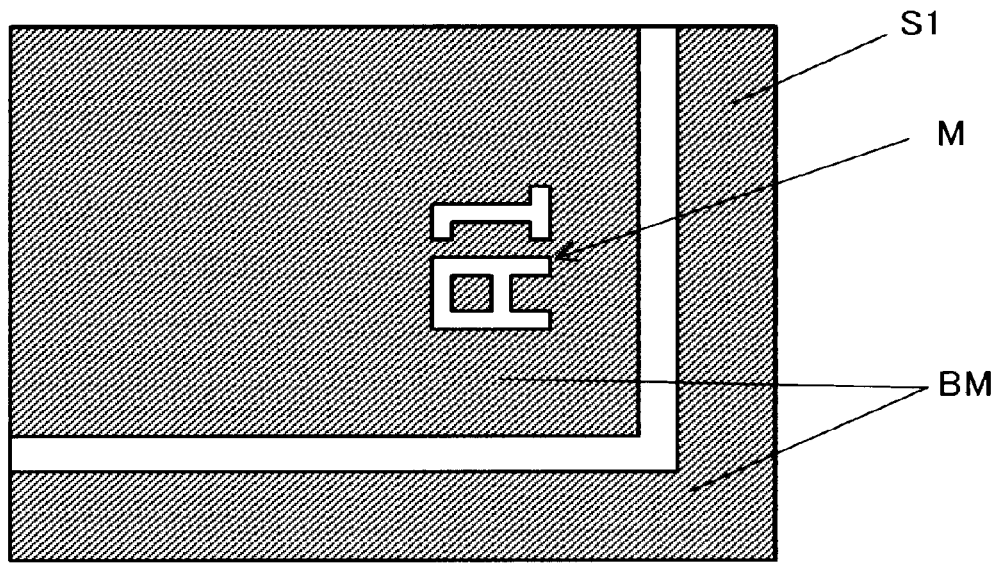
Figure 5:
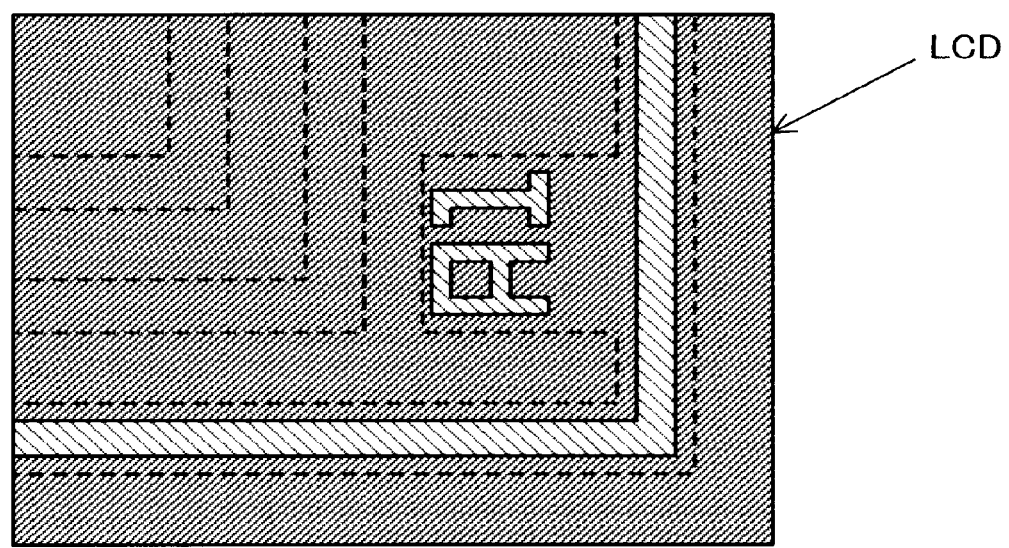
Figure 6:
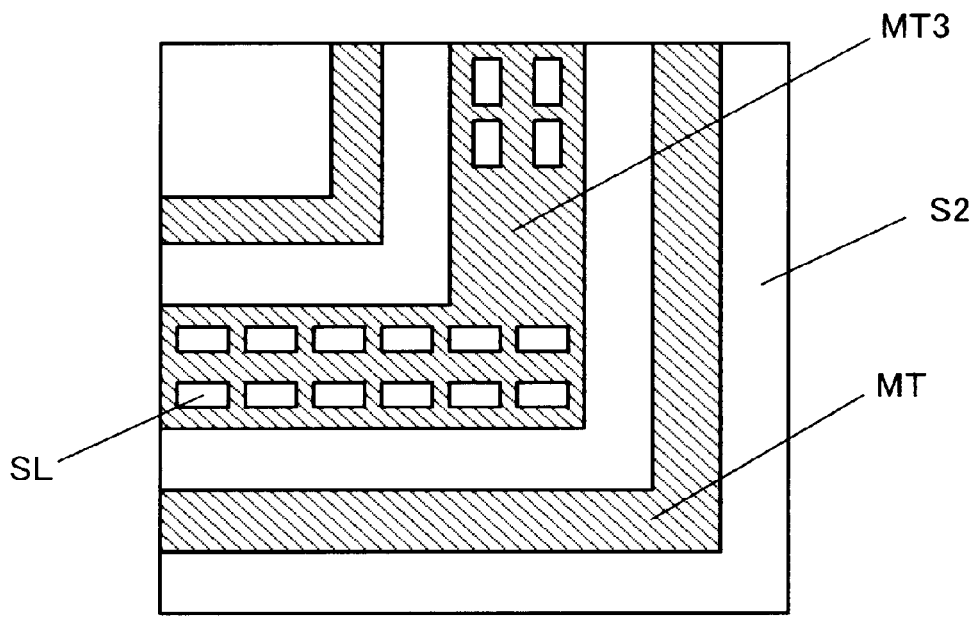
FIGS. 6A to 6C are diagrams for illustrating the TFT substrate (FIG. 6A), the CF substrate (FIG. 6B), and how the TFT substrate and the CF substrate are layered on top of each other (FIG. 6C) in the liquid crystal display panel according to the third embodiment within the dotted circle B in FIG. 3.
Figure 6:
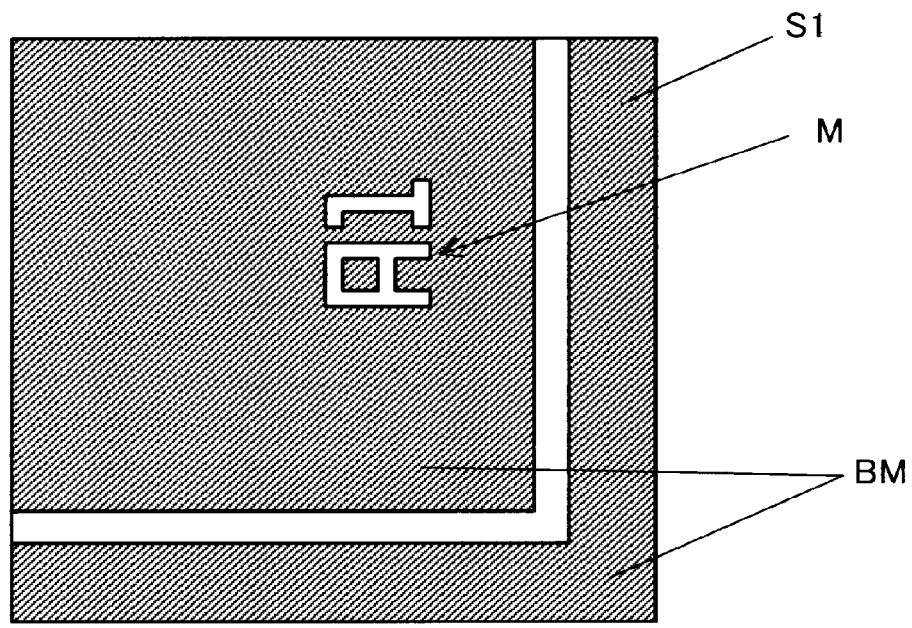
Figure 6:
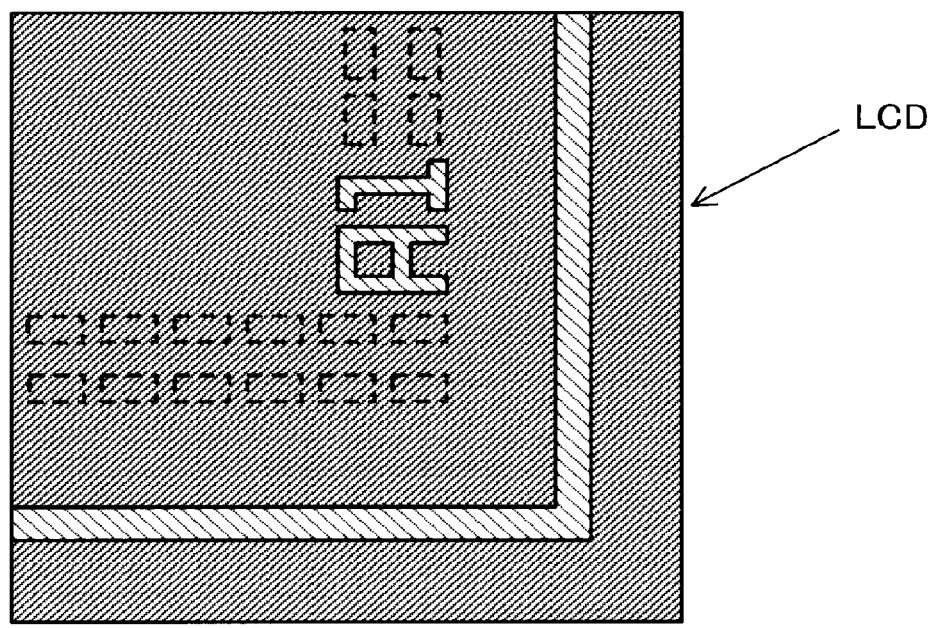

The liquid crystal display panel according to the present invention is described in detail below. FIGS. 3 to 7 are diagrams for illustrating the embodiments of the present invention, and the liquid crystal display panel according to the present invention is preferably applicable in the case where the light blocking region around the display unit DP of the panel LCD is formed to the sides of the panel LCD as shown in FIG. 3. The symbols in FIG. 3 are the same as in FIG. 1, and therefore, the descriptions thereof are omitted here. FIGS. 4A to 7 show an enlargement of the portion of the liquid crystal display panel LCD within the dotted circle B in FIG. 3.

The liquid crystal display panel LCD according to the present invention, wherein a CF substrate S1 on which color filters are formed and a TFT substrate S2 on which thin film transistor circuits are formed are layered on top of each other with liquid crystal being sealed between the two substrates, is characterized in that a black light blocking region BM is formed in a frame portion of the CF substrate S1, and an identification mark M drawn as a negative pattern is provided to a part of the light blocking region, and metal films MT1 to MT4 are provided to the TFT substrate S2 in such locations as to block light that transmits through the identification mark.

FIGS. 4A to 4C show the liquid crystal display panel LCD according to the first embodiment. As shown in FIG. 4B, an identification mark M is created as a negative pattern in the light blocking region BM on the CF substrate S1. It is possible to provide the identification mark using a resist pattern at the same time the light blocking region BM is formed. In FIG. 4B, the light blocking region BM is separated into two pieces by a slit in L shape (in the rectangular frame shape surrounding the display unit along the frame portion when the entirety of the panel is viewed). This slit is provided in order to prevent moisture from entering into the panel from the outside along the light blocking film, such as a black matrix.

On the TFT substrate S2, as shown in FIG. 4A, a metal film MT1 is formed in such a location as to correspond to the identification mark on the CF substrate S1 in addition to the conventional metal pattern, such as of wires. A wire MT is provided, as in a metal pattern, to the above-described slit in L shape (in the rectangular frame shape) of the light blocking region BM on the TFT substrate so that light blocking properties can be maintained in the structure.

The TFT substrate S2 in FIG. 4A and the CF substrate S1 in FIG. 4B can be layered on top of each other so as to provide a structure where, as shown in FIG. 4C, the identification mark is visible in such a state that the light blocking properties of the light blocking region are sufficiently secured as viewed from the front surface side of the panel LCD.

In FIG. 4A, the metal film MT1 is electrically detached from the other wires in the metal pattern formed on the TFT substrate so that it electrically flows. In this structure, the presence of the metal film MT1 makes it possible to prevent the wires from being electrically affected.

FIGS. 5A to 5C are diagrams for illustrating the liquid crystal display panel LCD according to the second embodiment of the present invention. This is different from the liquid crystal display panel in FIGS. 4A to 4C in that, as shown in FIG. 5A, the metal film MT2 formed on the TFT substrate S1 is electrically connected to a part of the other portion of the metal pattern so that the metal film MT2 can be grounded in the structure. As a result, static electricity can be prevented from being charged in the metal film MT2.

FIGS. 6A to 6C are diagrams for illustrating the liquid crystal display panel LCD according to the third embodiment of the present invention. This is different from the liquid crystal display panel in FIGS. 4A to 4C in that, as shown in FIG. 6A, the metal film MT3 formed on the TFT substrate S1 is part of a metal pattern where a great number of slits SL are created, and some slits SL are omitted in the location corresponding to the identification mark (solid metal film).

Thus, the already existing patterned metal can be used in order to make it unnecessary to separately secure a location where a metal film corresponding to the identification mark is provided, and therefore, reduction in the width of the frame can be further progressed. Here, a metal pattern where slits are created as in FIG. 6A is used to provide paths for light irradiated to harden a photo-setting resin for pasting the CF substrate S1 and the TFT substrate S2 together.

In the case where a patterned metal film, in which slits are created as in FIG. 6A, works as a part of a wire, the provision of the metal film MT3 locally changes the electrical resistance value. In order to prevent a problem from occurring as a result of this, it is possible to adjust the balance of distribution of the electrical resistance value in the metal pattern by forming a similar metal film (region where slits are omitted) in such a location that this metal film and the metal film MT3 are in point symmetry or line symmetry in the entire pattern of the wires.

Figure 7:
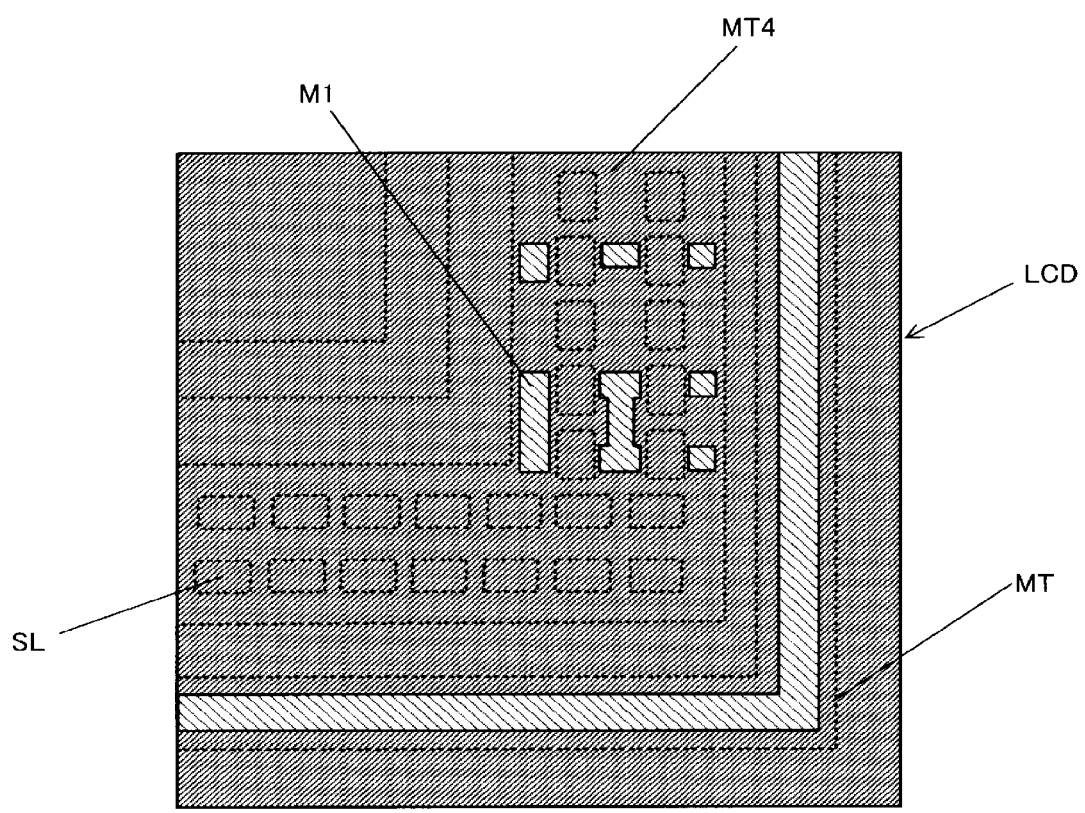
FIG. 7 is a diagram for illustrating how the TFT substrate and the CF substrate are layered on top of each other in the liquid crystal display panel according to the fourth embodiment within the dotted circle B in FIG. 3.

FIG. 7 is a diagram for illustrating the liquid crystal display panel LCD according to the fourth embodiment of the present invention. This is different from the liquid crystal display panels in FIGS. 6A to 6C in that the metal film MT4 in which slits are created has the same pattern as in the prior art, and thus, unlike in FIG. 6A, the metal film MT3 where slits are omitted in a certain portion is not used to provide an identification mark. As a result, it is unnecessary to design a new metal pattern, and in addition, the electrical resistance value can be prevented from varying.

In FIG. 7, the identification mark M1 created on the CF substrate avoiding the locations of the slits in the metal pattern is provided by selectively removing the light blocking film from the light blocking region in portions corresponding to the metal film between slits. The thus-created set of slits provides the identification mark.

As described above, the present invention makes it possible to provide a liquid crystal display panel where an identification mark can be provided while achieving a reduction in the width of the frame.

What is claimed is:

1. A liquid crystal display panel comprising:
   a first substrate including a black light blocking layer;
   a TFT substrate including a thin film transistor circuit and metal wirings;
   a liquid crystal layer between the first substrate and the TFT substrate; and
   a sealant having a photo-setting resin and pasting the first substrate and the second substrate,
   wherein the black light blocking layer has a black light blocking film, an opening portion, and a slit in a peripheral region outside a display region,
   wherein the opening portion and the slit are openings where the black light blocking film is removed,
   wherein the opening portion and the slit are separated from each other,
   wherein the slit includes a first portion extending along a first edge of the first substrate and a second portion extending along a second edge of the first substrate,
   wherein the black light blocking layer is positioned along an outer edge of the first substrate,
   wherein the metal wirings include a first metal wiring and a second metal wiring,
   wherein the first metal wiring is a single wiring, and the second metal wiring is a single wiring different from the first metal wiring,
   wherein the first metal wiring is located between the first edge and the second metal wiring,
   wherein the second metal wiring is located between the display region and the first metal wiring,
   wherein a wiring width of the single wiring as the second metal wiring is wider than a wiring width of the single wiring as the first metal wiring,
   wherein the single wiring as the second metal wiring has a plurality of openings formed in the single wiring as the second metal wiring itself,
   wherein the first metal wiring overlaps with the first portion of the slit and the second portion of the slit, and the plurality of openings overlaps with the sealant and the black light blocking film, and
   wherein the opening portion of the black light blocking layer overlaps with the second metal wiring and does not overlap with the plurality of openings of the second metal wiring.

2. The liquid crystal display panel according to claim 1, wherein the first metal wiring is located in vicinity of the first edge and the second edge in plan view,
   wherein the black light blocking layer has an outer edge and the outer edge of the black light blocking film coincides with the outer edge of the first substrate, and
   wherein a part of the black light blocking film is between the slit and the opening portion.

3. The liquid crystal display panel according to claim 1, wherein the first portion and the second portion are connected to each other.

4. The liquid crystal display panel according to claim 1, wherein the slit surrounds the display region in plan view.

5. The liquid crystal display panel according to claim 1, wherein the first metal wiring is located in vicinity of the sealant in plan view, and
   wherein the opening portion of the black light blocking layer overlaps with the sealant.

6. The liquid crystal display panel according to claim 1, wherein the first portion of the slit and the second portion of the slit extend straightly, and
   wherein the opening portion has a shape of an alphabetical character or a number.

7. The liquid crystal display panel according to claim 1, wherein the slit includes a third portion at a corner portion of the black light blocking layer, and
   wherein the first portion, the second portion, and the third portion are connected to each other.

8. The liquid crystal display panel according to claim 7, wherein the third portion connects the first portion and the second portion.

9. The liquid crystal display panel according to claim 1, wherein the opening portion is an identification mark,
   wherein the identification mark has a first mark and a second mark, and
   wherein the first mark has an alphabetical character shape, and the second mark has a number shape.

10. The liquid crystal display panel according to claim 1, wherein the plurality of openings of the second metal wiring have a first opening group and a second opening group, and
    wherein the opening portion of the black light blocking layer overlaps with a metal region of the second metal wiring between the first opening group and the second opening group.

11. The liquid crystal display panel according to claim 10, wherein the metal region which has no opening of the second metal wiring covers an entire area of the opening portion of the black light blocking layer.

* * * * *